(12) United States Patent
Boer et al.

(10) Patent No.: US 8,066,425 B2
(45) Date of Patent: Nov. 29, 2011

(54) HOMOGENISATION VALVE

(75) Inventors: Willem George Boer, Johannesburg (ZA); Graham Innes Sanders, Fourways (ZA)

(73) Assignee: Chemical Services Limited, Bryanston (ZA)

( * ) Notice: Subject to any disclaimer, the term of this patent is extended or adjusted under 35 U.S.C. 154(b) by 1029 days.

(21) Appl. No.: 11/998,993

(22) Filed: Dec. 3, 2007

(65) Prior Publication Data
US 2009/0141584 A1 Jun. 4, 2009

(51) Int. Cl.
*B01F 5/08* (2006.01)

(52) U.S. Cl. ........................................ 366/176.2; 138/43
(58) Field of Classification Search ................ 366/176.1, 366/176.2; 138/42, 43; 137/625.3; 251/63.5, 251/63.6, 121
See application file for complete search history.

(56) References Cited

U.S. PATENT DOCUMENTS

| | | | | |
|---|---|---|---|---|
| 1,342,955 A | * | 6/1920 | Gebhardt | 251/333 |
| 1,925,787 A | * | 9/1933 | Brooks | 366/176.2 |
| 2,504,678 A | * | 4/1950 | Gardner | 366/336 |
| 2,882,025 A | * | 4/1959 | Loo | 366/340 |
| 3,252,300 A | * | 5/1966 | Hofmann | 464/38 |
| 3,253,300 A | * | 5/1966 | Gove et al. | 165/64 |
| 3,894,716 A | * | 7/1975 | Barb | 251/127 |
| 4,060,099 A | * | 11/1977 | Bates, Jr. | 137/625.3 |
| 4,592,839 A | * | 6/1986 | Rosenberg | 210/352 |
| 5,451,106 A | * | 9/1995 | Nguyen et al. | 366/172.2 |
| 5,941,281 A | * | 8/1999 | Baumann et al. | 137/625.33 |
| 6,244,739 B1 | * | 6/2001 | Jarchau et al. | 366/176.2 |
| 6,550,956 B1 | * | 4/2003 | Utracki et al. | 366/176.2 |
| 7,013,918 B2 | * | 3/2006 | McCarty et al. | 137/625.33 |
| 2009/0141584 A1 | * | 6/2009 | Boer et al. | 366/336 |

* cited by examiner

*Primary Examiner* — Tony G Soohoo
(74) *Attorney, Agent, or Firm* — The Webb Law Firm

(57) ABSTRACT

The invention relates to an improved homogenisation valve, and more particularly, but not exclusively, to a homogenisation valve for use in homogenising emulsion explosives. The homogenisation device comprises a body having a flow passage therethrough, opposing first and second homogenisation members located in the flow passage; the homogenisation members having opposing homogenisation surfaces that form a flow restriction of the flow passage therebetween. At least one of the homogenisation surfaces has a flow resistance being suitable to cause at least part of the flow passing through the flow restriction to be diverged in a non-linear path across the homogenisation surface.

30 Claims, 7 Drawing Sheets

HOMOGENISATION VALVE

FIELD OF THE INVENTION

The invention relates to an improved homogenisation valve, and more particularly, but not exclusively, to a homogenisation valve for use in homogenising emulsion explosives.

BACKGROUND TO THE INVENTION

Homogenisation is the process of obtaining a uniform composition and stable structure throughout a fluid comprising more than one phase by subjecting the fluid to a fluid mechanical process that involves the subdivision of particles or droplets into small sizes so as to create a dispersion or emulsion.

Homogenising devices, including homogenisation valves suitable for homogenising emulsions, are well know in industry. In essence a homogenisation valve comprises a valve body in which a stationary seat and a spring-loaded plug is located. The plug is biased towards a closed position in which the plug abuts the seat. The plug and/or the seat typically include at least one annular protrusion that abuts the corresponding seat and/or plug, thus forming a narrow homogenisation gap between the plug and the seat.

During homogenisation, a fluid to be homogenised is pumped into an inlet of the valve body under a pressure being sufficient to displace the plug slightly from the seat The fluid subsequently flows through the homogenisation gap, and is subjected to substantial shear forces. As expected, the flow through the homogenisation gap generally exhibits the properties associated with fluid flow between two substantially parallel surfaces, and a shear stress profile develops that ranges from a maximum at the surfaces, and a minimum towards the centre of the flow path. The shear stress induced in the fluid causes bodies such as droplets of the fluid to be homogenised and to be dispersed into smaller droplets. The mass-median droplet diameter of the fluid is thus reduced, which is for instance advantageous when working with emulsions as emulsions are usually of better quality and stability if it has a small mass-median droplet diameter.

In an improved embodiment, a homogenisation valve may include a plurality of annular ridge formations, wherein adjacent ridge formations extend from the plug and seat respectively so as to form a labyrinth or undulating flow path through the homogenisation valve. Pressure recovery regions are therefore formed between adjacent homogenisation gaps, and fluid diverges into these pressure recovery regions once the fluid exits the narrow homogenisation gaps. It will be appreciated that the fluid only diverges in planes substantially normal to the flow through the homogenisation gaps.

One particular homogenisation application is the homogenisation of emulsion explosives. Emulsion explosives have unusual physical properties in that they are made from a large volume of a mobile aqueous phase dispersed in a small volume of a mobile continuous phase usually comprising oils and emulsifiers. These types of compositions tend to have high viscosity, even if the dispersed aqueous phase droplets are not of a very small size. The Reynolds number of the fluid when in motion, being an inverse function of the viscosity, is therefore relatively low, resulting in the flow remaining laminar as there is no transition to a turbulent flow regime. When the fluid is introduced into the homogenisation valve, the flow remains laminar throughout, even when it is accelerated though the homogenisation gap. As described above, the shear stresses peak at the surfaces of the homogenisation gaps, and are lower towards the centre of the fluid flow path. Consequently, large droplets towards edges of the fluid flow path are dispersed into smaller droplets, whereas droplets towards the centre of the fluid remain substantially unchanged.

As described above, the flow remains laminar throughout, and the absence of any turbulence results in droplets travelling along particular streamlines not to be redistributed normal or transverse to the plane of flow through the homogenisation gaps. As mentioned above, there may be some degree of divergence when the fluid flows from a homogenisation gap to a pressure recovery zone, but the fluid divergence still only result in the divergence of streamlines in a plane normal to the flow through the homogenisation gap, and not in redistribution of droplets across streamlines. The droplets in the central zone of the fluid therefore remains substantially unchanged, whereas the droplet-size at the edges of the fluid is reduced to smaller diameters. Homogenisation is therefore not complete, and not efficient

OBJECT OF THE INVENTION

It is accordingly an object of the invention to provide a homogenisation valve that will, at least partially, alleviate the disadvantages as described hereinbefore.

SUMMARY OF THE INVENTION

According to the invention there is provided a homogenisation device comprising a body having a flow passage therethrough;

opposing first and second homogenisation members located in the flow passage;

the homogenisation members having opposing homogenisation surfaces that form a flow restriction of the flow passage therebetween;

at least one of the homogenisation surfaces having a flow resistance being suitable to cause at least part of the flow passing through the flow restriction to be diverged in a non-linear path across the homogenisation surface.

At least one of the homogenisation members may include a ridge formation projecting therefrom, the ridge formation terminating in an upper face that forms the homogenisation surface that opposes a homogenisation surface of the opposing homogenisation member so as to define the flow restriction.

The ridge formation may include a first edge and a second edge opposite the first edge, a face of the ridge formation extending between the first edge and the second edge. Preferably the first edge is an operatively downstream edge, and the second edge is an operatively upstream edge.

The face of the ridge formation may be adapted to have a flow resistance being suitable to cause at least part of the flow passing through the flow restriction to be diverged in a non-linear path across the face, and thus the homogenisation surface.

At least the first edge of the ridge formation may be of non-circular profile when viewed in plan.

The first edge may be of oscillating profile when viewed in plan so as to form troughs and peaks.

Preferably the profile of the first edge may be undulated, convoluted, castellated or zigzagged.

The first edge and the second edge of the ridge formation may have substantially the same profile.

At least a first section of an upper edge of a trough defined by the oscillating ridge formation may be bevelled so as to cause flow to diverge as it enters the trough, whereas an opposing second section of an upper edge of the trough is preferably substantially square in order for the flow over the square edge to be diverged less than the flow over the bevelled edge.

Alternatively the homogenisation surface of the ridge formation may have areas of different roughness in order for the homogenisation surface to have a flow resistance being suitable to cause at least part of the flow passing through the flow restriction to be diverged in a non-linear path across the homogenisation surface.

The homogenisation surface of the ridge formation may be substantially parallel to the homogenisation surface of the opposing homogenisation member so as to render the flow passage substantially parallel.

Preferably at least one of the homogenisation members is of circular circumference when viewed in plan, with the ridge formation projecting from said valve member being substantially annular.

Annular ridge formations may project from both homogenisation members, the annular ridges being concentric and of unequal diameter so as to form spaced apart inner and outer ridges forming an undulating flow path across faces of the homogenisation members, each ridge formation being opposed to an opposing homogenisation member so as to define a plurality of flow restrictions in the undulating flow path.

An innermost annular ridge formation may preferably be the operatively upstream ridge formation, and an outermost annular ridge formation may preferably be the operatively downstream ridge formation.

The flow restrictions formed by adjacent ridge formations may be of different heights and/or widths.

Preferably a distance between an upper face of a ridge formation and an opposing homogenisation member will be greater at an inner ridge formation compared to an outer ridge formation.

The annular ridge formation with the smallest diameter preferably has the largest width, and the annular ridge formation with the largest diameter preferably has the smallest width.

In a preferred embodiment one annular ridge formation projects from the first homogenisation member, and two annular ridge formations project from the second homogenisation member, the annular ridge formation projecting from the first homogenisation member being located between the annular ridge formations projecting from the second homogenisation member.

The first homogenisation member may be in the form of a valve seat and the second homogenisation member may be in the form of a valve plug.

An inlet flow passage to the homogenisation device may be located towards the centre of the seat, so that fluid entering the flow passage between the plug and the seat is conveyed from the centre of the seat, radially outwardly through the undulating flow path formed between the homogenisation members towards peripheries of the homogenisation members.

The plug may be moveable relative to the seat between a closed position in which the upper face of at least one ridge formation abuts its opposing plug or seat and an open position wherein the upper faces of all the ridge formations are displaced from the opposing plug or seat.

The plug may be biased towards the seat in order for the plug to be displaceable away from the seat when a pressurised fluid to be homogenised is introduced into the homogenisation device.

According to a further aspect of the invention there is provided a homogenisation member suitable for use in a homogenisation device, the homogenisation member being of the type as described hereinbefore.

The homogenisation member may be in the form of a plug, and alternatively the homogenisation member may be a seat.

BRIEF DESCRIPTION OF THE DRAWINGS

One embodiment of the invention is described by way of a non-limiting example, and with reference to the accompanying figures in which.

DETAIL DESCRIPTION OF THE INVENTION

Figure 1:
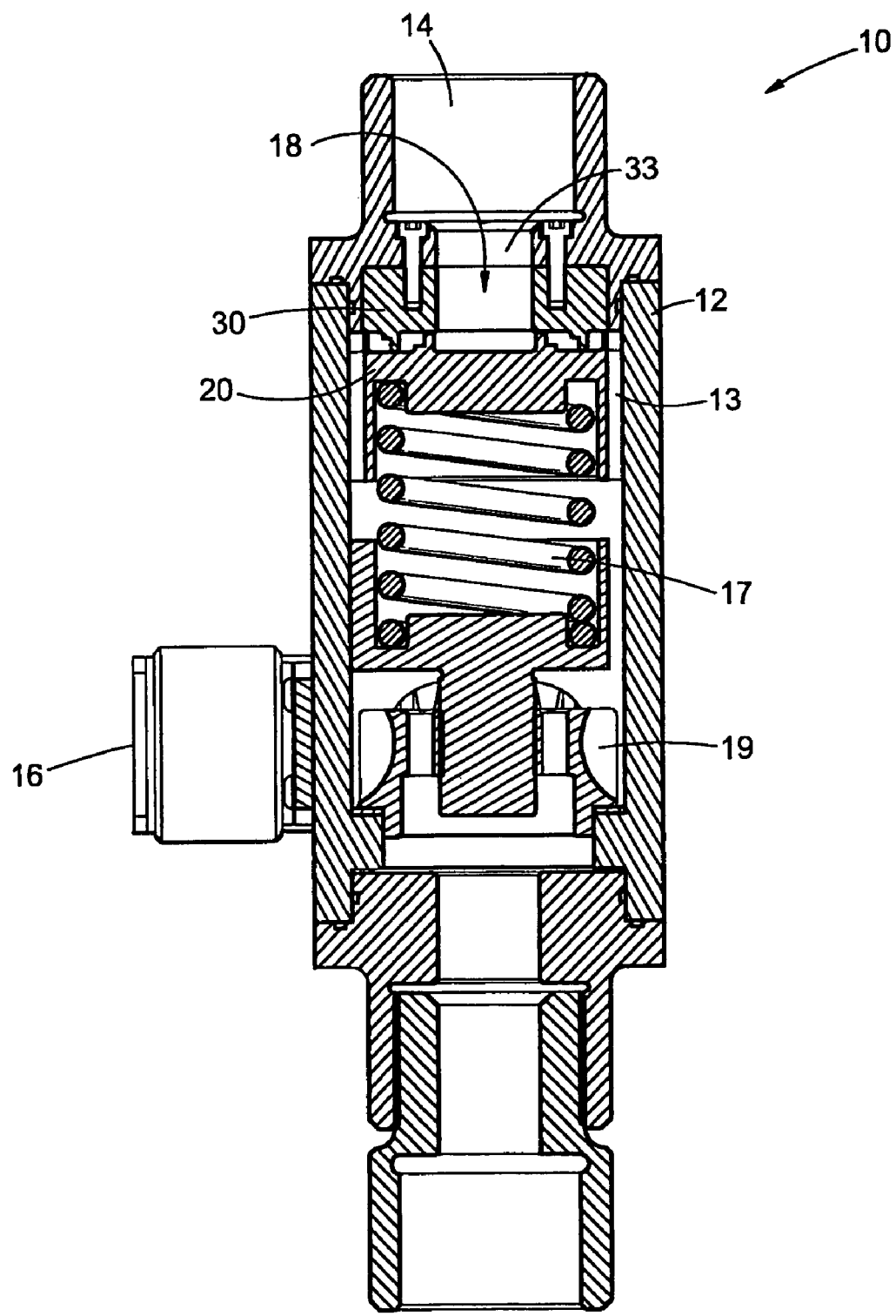
FIG. 1 is a cross-sectional side view of a homogenisation valve in accordance with the invention.

Referring to the figures, in which like numerals indicate like features, a non-limiting example of a homogenisation device, in the form of a homogenising valve, in accordance with the invention is generally indicated by reference numeral 10. The homogenisation valve 10, as shown in FIG. 1, includes a valve body 12 having an inlet 14, an outlet 16 and a flow passage therebetween. An internal valve assembly 18 comprising a plug 20 and a seat 30 is located in the flow passage. The homogenisation valve 10 also include biasing means 17 in the form of a helical spring for biasing the plug 20 towards the seat 30 as described in more detail hereinbelow. The magnitude of the bias exerted by the biasing means can be adjusted by means of adjustment means 19.

Figure 2:
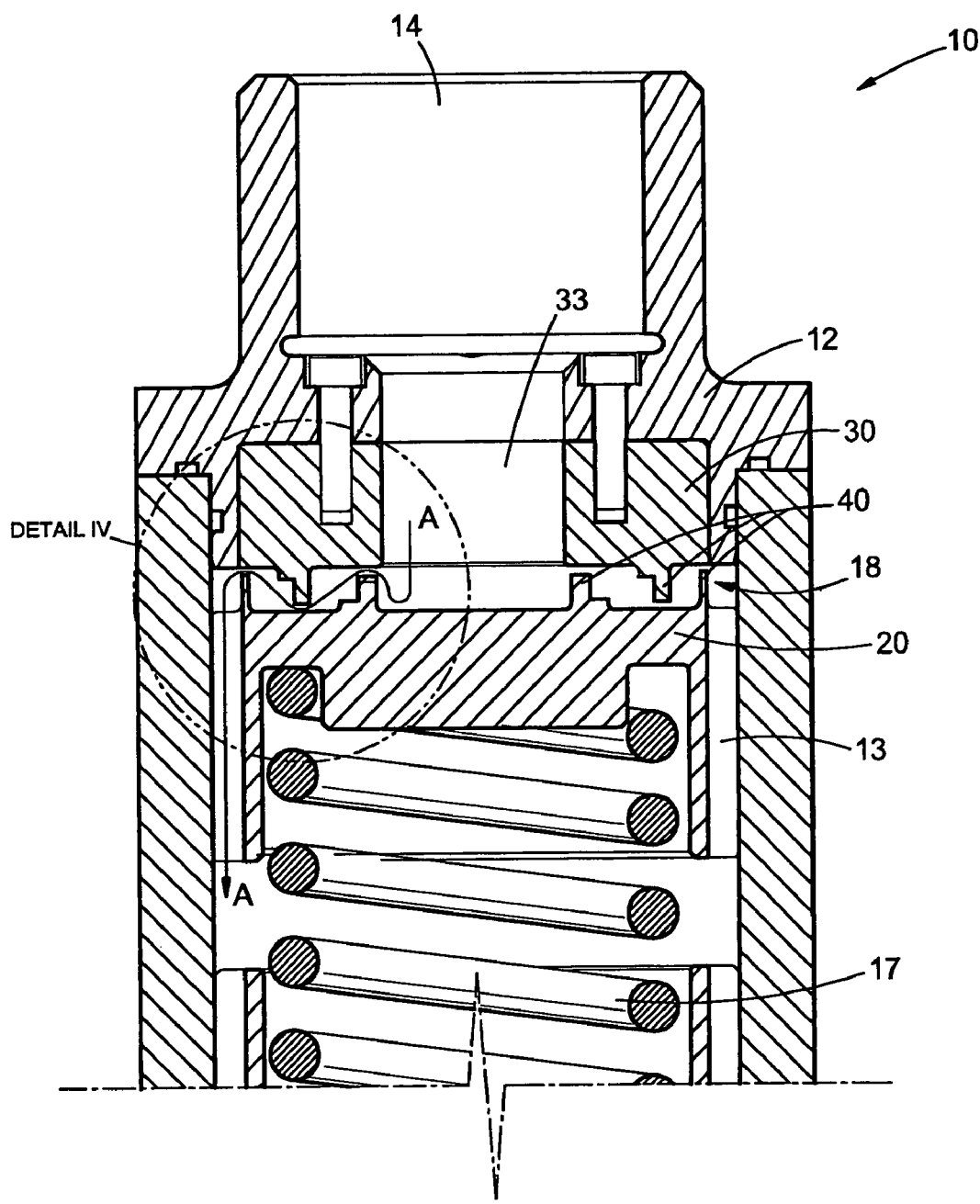
FIG. 2 is an enlarged view of the upper part of the homogenisation valve of FIG. 1.

FIG. 2 shows the upper part of the homogenisation valve 10 in more detail. The seat 30 is stationary mounted to the valve body 12, and the inlet 14 to the valve 10 is in flow communication with an inlet passage 33 in the centre of the seat 30. An opposing plug 20 is located opposite the seat 30, and is slideably mounted within the valve body 12. The plug 30 is urged against the seat 30 by way of the helical spring 17. An annular volume 13 about the internal valve assembly 18 is in flow communication with the outlet 16 of the valve 10. A flow path (indicated by arrow A) is therefore formed from the inlet 14, through the internal valve assembly 18 into the annular volume 13 and out through the outlet 16.

As mentioned above the internal valve assembly 18 comprises a plug 20 and a seat 30. The internal valve assembly constitutes a flow restriction in the main flow passage (arrow A), in which homogenisation occurs. Both the plug 20 and the seat 30 have annular ridges 40 extending therefrom. As can best be seen in FIGS. 3 and 4, each ridge 40 includes an upper face 45 and two opposite edges, being a first or outer edge 47 and a second or inner edge 46. The plug 20 and seat 30 are orientated so that the upper faces 45 of the ridges are located in close proximity to operative faces 32 and 22 of the opposing seat 30 or plug 20. An undulating flow path (arrow B in FIG. 4) is formed between the restrictions caused by adjacent ridges. Three annular ridges are provided, being an outer ridge 53 extending from the plug 20, a centre ridge 52 extending from the seat 30, and an inner ridge 51 extending from the plug.

Figure 3:
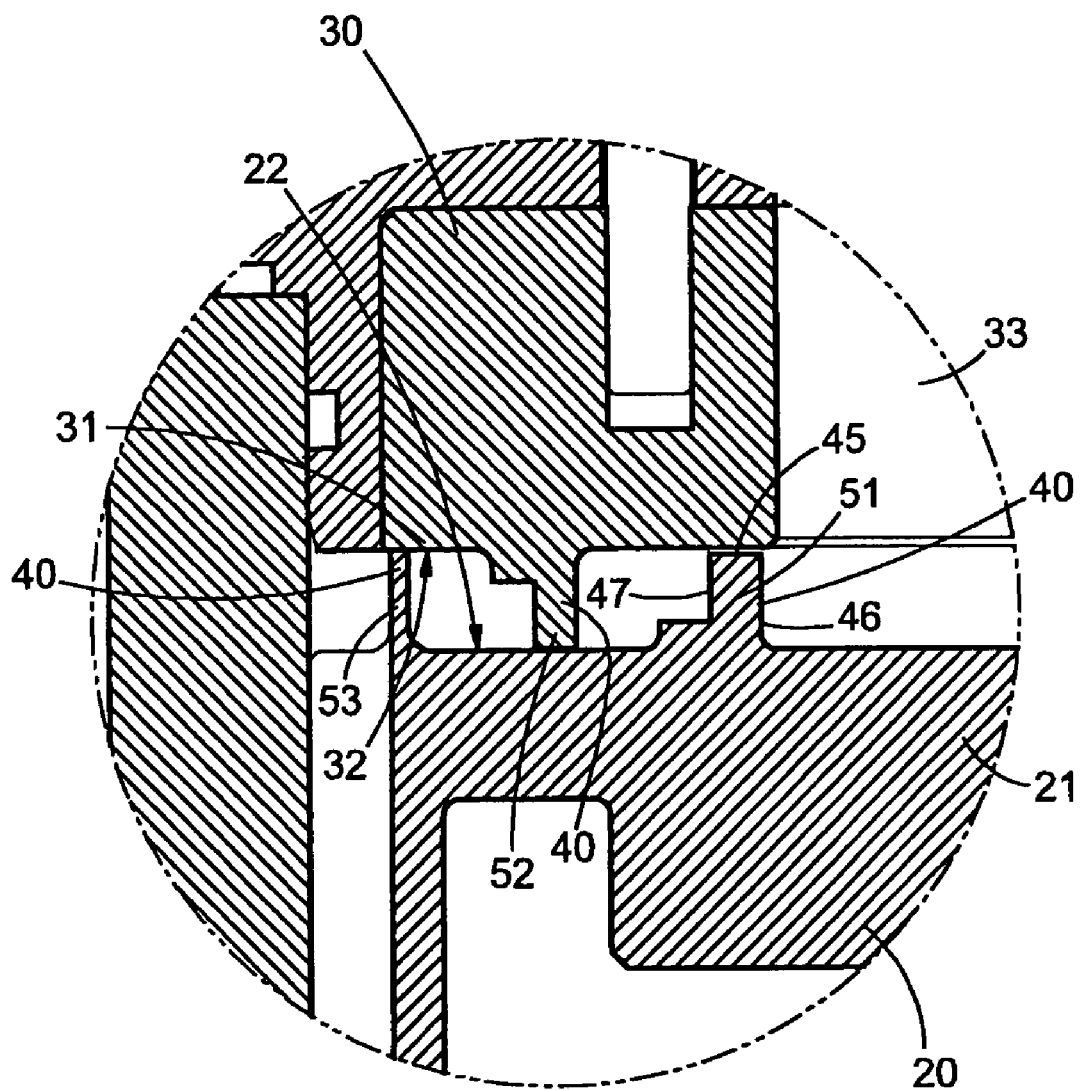
FIG. 3 shows the plug and seat of the homogenisation valve in a closed position.

When the plug is urged against the seat, as is shown in FIG. 3, the upper face 45 of the outer ridge 53 abuts the base 31 of the seat 30. Small gaps are still present between the centre ridge 52 and the plug 20, and also between the inner ridge 51 and the seat 30, due to the different ridges being of different height. The height and width of the ridges are selected for the homogenisation valve to operate in a progressive, stepwise manner so as to reduce the mass-median droplet diameter. More particularly, the flow path lengths across the three ridges are optimised by the ridges decreasing in width with the inner ridge 51 having the major width and the outer ridge 53 the minor, whilst the height of the ridges, and more particularly the homogenisation gaps formed by the ridges, are optimised by the ridges increasing in height with the inner ridge having the minor height and the outer ridge having the major height.

Figure 4:
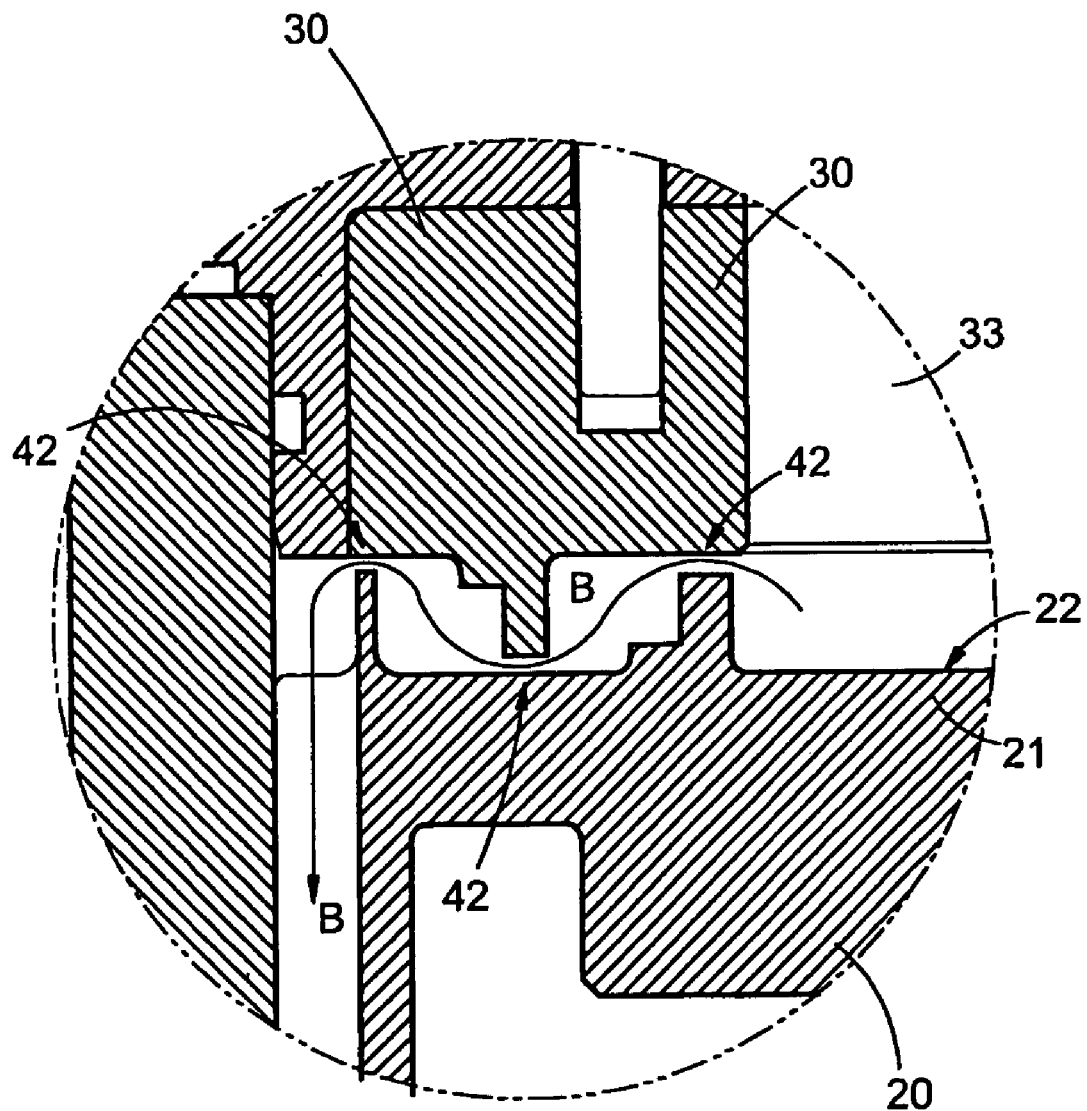
FIG. 4 shows the plug and seat of the homogenisation valve in an open position.

In FIG. 4 the internal valve assembly is shown in an open position wherein the plug 20 is displaced away from the seat 30 so as to open up the undulating flow path indicated by arrow B.

Figure 5:
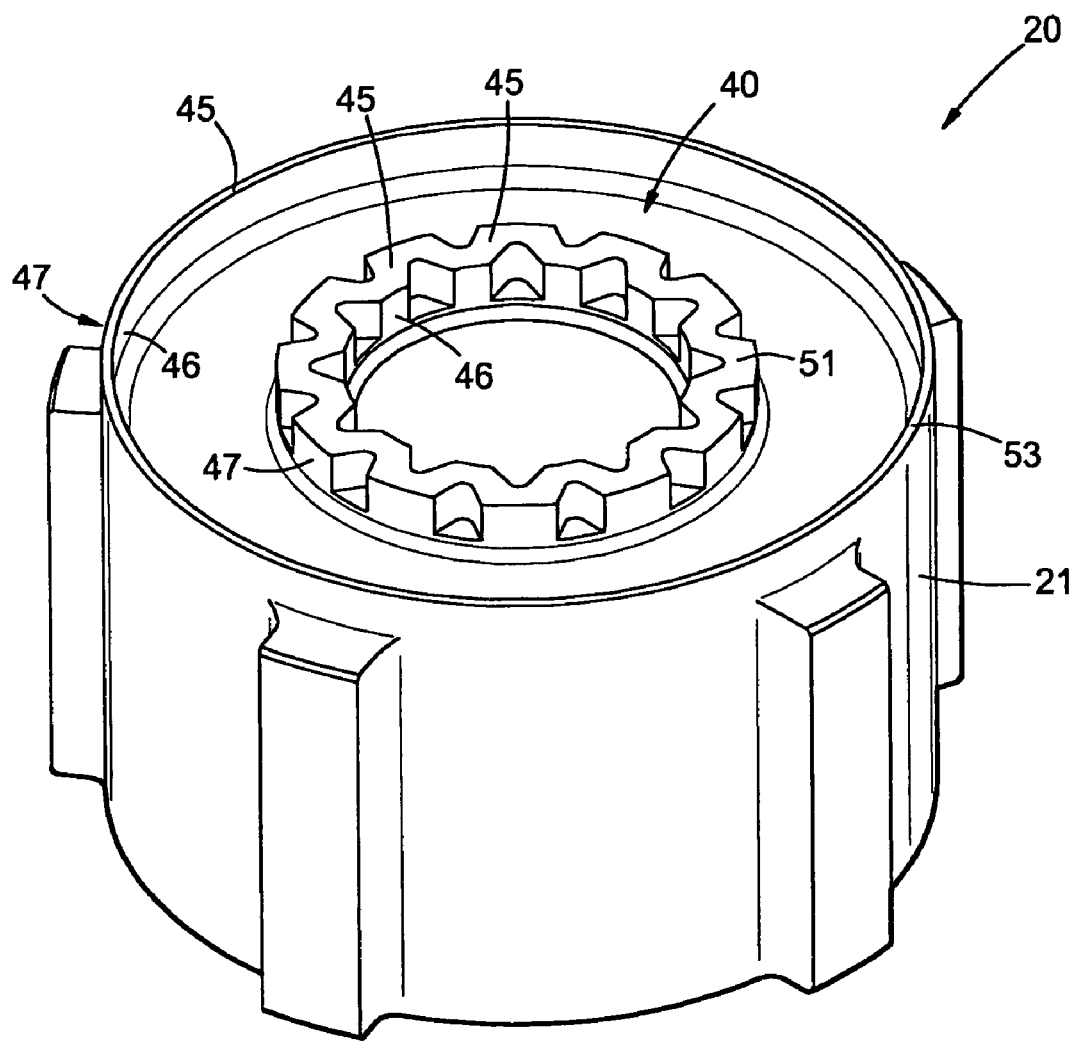
FIG. 5 is a perspective view of a plug in accordance with the invention.
Figure 6:
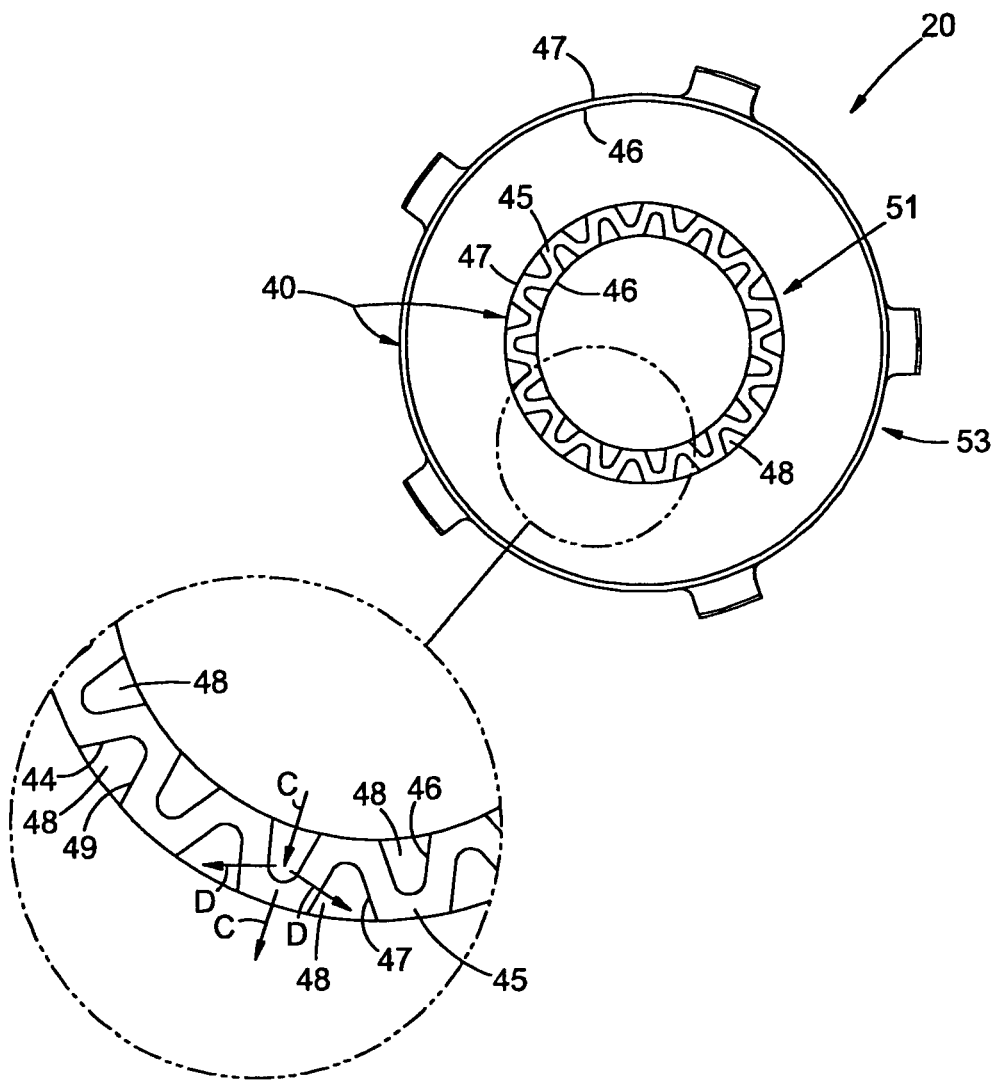
FIG. 6 is a plan view of the plug of FIG. 5.
Figure 7:
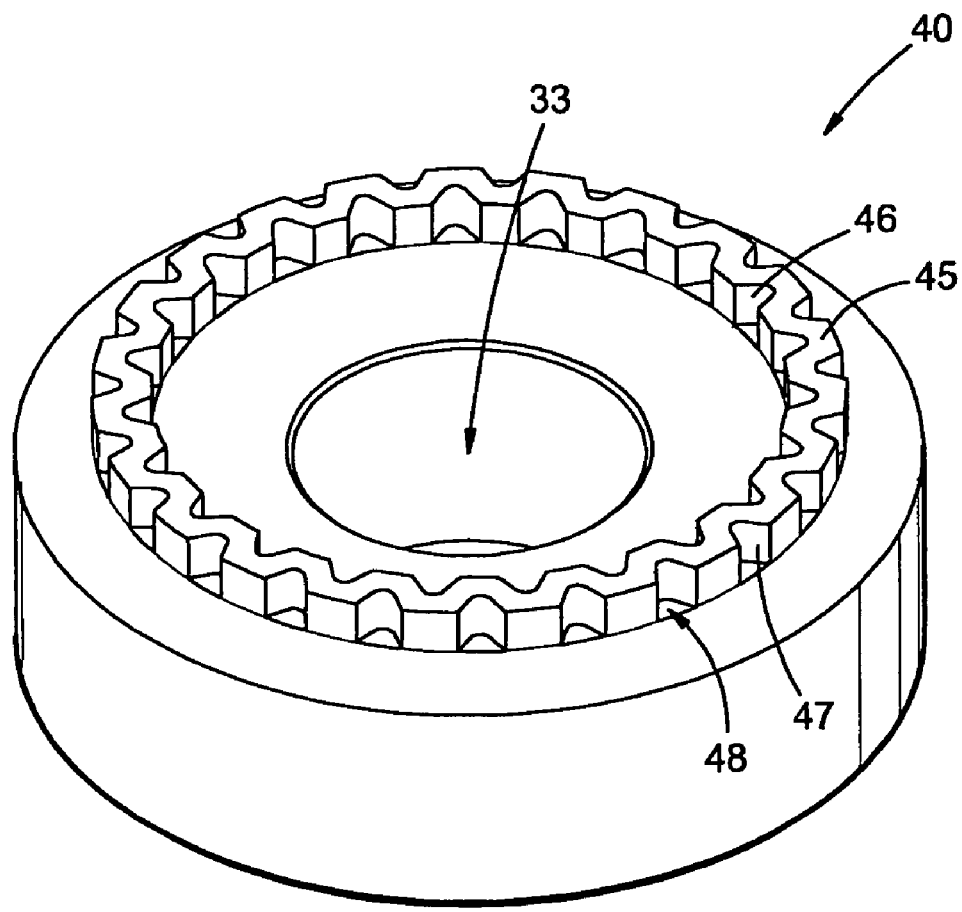
FIG. 7 is a perspective view of a seat in accordance with the invention.

A perspective view of the plug 20 is shown in FIG. 5. Two annular ridges, being the inner ridge 51 and outer ridge 53 extends from the body 21 of the plug. Both ridges have outer edges 47 and inner edges 46, as well as upper faces 45 directed away from the body 21 of the plug. The edges 46 and 47 of the outer ridge 53 are circular when viewed in plan, as is shown in FIG. 6. A plurality of apertures 48 or indentations are located in the inner ridge 51, thus rendering the sides of the inner ridge 51 non-circular, and more particularly convoluted when viewed in plan for reasons which will become apparent hereinbelow. The convoluted arrangement forms a number of troughs and peaks in the sides of the ridge, the troughs defining mixing zones wherein the fluid to be homogenised is mixed between adjacent ridges. Selected edges 44 may in addition be tapered or bevelled relative to the upper face 45 of the inner ridge 51. A perspective view of the seat 30 is shown in FIG. 7, the ridge embodying the same features as that of the inner ridge 51.

In use a fluid to be homogenised is pumped into the inlet 14 and forced against the plug 20 of the internal valve assembly 18. The pressurised fluid exerts a force on the plug 20, and the plug is displaced from the seat 30. The displacement force exerted by the fluid is opposed by the helical spring 17, and the forces are balanced at an operating position where the plug is slightly displaced from the seat. The fluid is subsequently forced though the flow restrictions 42 formed by the annular ridges 51, 52 and 53. The decreased flow area in these zones result in an increase in velocity, and thus also in increased shear stresses in the fluid resulting in the fluid particles being mechanically broken up into smaller particles or droplets.

The effect of the profiled annular ridges is described with reference to FIG. 6. The fluid entering the internal valve assembly 18 initially travels in a radial direction indicated by arrow C. Once the fluid reaches the inner edge 46 of the annular ridge 40 it is forced through the homogenisation gap formed between the upper face 45 of the ridge and the opposing seat (not shown). Initially the fluid maintains the radial flow direction, but due to the convoluted profile of the annular ring, part of the fluid diverges at positions where the flow resistance in direction other than the radial direction is less than in the radial direction. A typical flow pattern is shown by arrow D, and it can be seen that part of the fluid maintains the radial flow direction, whilst some of the fluid diverges towards the apertures 48 located in the annular ring 40 due to the reduced flow resistance. The diverging flow results in the fluid mixing immediately after exiting the homogenisation gap, and the particle distribution is thus randomised prior to entering the next homogenisaton gap.

The degree of mixing may be further increased by introducing tapered edges 44 at selected locations on the annular ridges 40. Again referring to FIG. 6, edge 44 is tapered relative to the upper face 45 of the ridge, whereas an opposing edge 49 is substantially square. Fluid entering the aperture 48, or mixing zone, between the two edges subsequently enters the aperture at different relative angles, and the offset result in the fluid forming a vortex when the two streams meet, thus further improving mixing after the annular ridge 40.

It will be appreciated that mixing is therefore achieve between adjacent ridges, and thus between adjacent homogenisation zones, which result in more efficient homogenisation of the fluid without having to remove the fluid from the valve between homogenisation stages.

The inventors foresee that the new homogenisation valve will alleviate the disadvantages associated with existing technology, especially insofar the homogenisation of emulsion explosives and other fluid of high viscosity is concerned.

It will also be appreciated that there may be many variations in detail without departing from the spirit and the scope of the invention. For example, the diverging flow patterns may be achieved by any configuration that results in non-uniform flow resistance, such as using a zigzag pattern, or providing zones of different surface roughness on the upper face of the annular ridge. The operation of the valve may furthermore be inverted in that fluid may enter the internal valve assembly from the periphery of the plug and seat, and may exit the internal valve assembly through a flow passage located in the plug. The inventor also foresees that any number of annular ridges may extend from both the plug and the seat.

The invention claimed is:

1. A homogenisation device including:
   a body having a flow passage therethrough;
   opposing first and second homogenisation members located in the flow passage;
   the homogenisation members having opposing homogenisation surfaces that form a flow restriction of the flow passage therebetween;
   at least one of the homogenisation surfaces creating a flow resistance that causes at least part of a flow passing through the flow restriction to be diverged in a non-linear path across the homogenisation surface,
   wherein at least one of the homogenisation members includes a ridge formation protruding therefrom, the ridge formation terminating in an upper face defining the homogenisation surface,
   wherein the ridge formation includes a first edge and a second edge opposite the first edge, the upper face of the ridge formation extending between the first edge and the second edge, and
   wherein the first edge of the ridge formation is of non-circular profile when viewed in plan.

2. The homogenisation device of claim 1 wherein the first edge is a downstream edge, and the second edge is an upstream edge.

3. The homogenisation device of claim 1 wherein the first edge is of oscillating profile when viewed in plan so as to form lateral troughs and peaks in the ridge formation.

4. The homogenisation device of claim 3 wherein the profile of the first edge is any profile selected from the group including undulated, convoluted, castellated or zigzagged.

5. The homogenisation device of claim 3 wherein an upper edge of each trough is at least partially bevelled so as to cause flow to diverge as it enters the trough.

6. The homogenisation device of claim 1 wherein the upper face of the ridge formation includes zones of different surface roughness in order for the homogenisation surface to create a non-uniform flow resistance that causes at least part of the flow passing through the flow restriction to be diverged in a non-linear path across the homogenisation surface.

7. The homogenisation device of claim 1 wherein the upper face of the ridge formation is substantially parallel to the homogenisation surface of the opposing homogenisation member so as to render the flow passage substantially parallel.

8. The homogenisation device of claim 1 wherein at least one of the homogenisation members is of circular circumference when viewed in plan, with the ridge formation projecting from said valve member being substantially annular.

9. The homogenisation device of claim 8 wherein annular ridge formations project from both homogenisation members.

10. The homogenisation device of claim 9 wherein the annular ridges are concentric and of unequal diameter in order to form spaced apart inner and outer ridges that define an undulating flow path across faces of the homogenisation members, each ridge formation being opposed to an opposing homogenisation member so as to form a plurality of flow restrictions in the undulating flow path.

11. The homogenisation device of claim 10 wherein an innermost annular ridge formation is an upstream ridge formation with respect to the flow through the flow passage, and an outermost annular ridge formation is a downstream ridge formation with respect to the flow through the flow passage.

12. The homogenisation device of claim 11 wherein the innermost ridge formation has the largest width between the first edge and the second edge of the innermost ridge formation, and the outermost ridge formation has the smallest width between the first edge and the second edge of the outermost ridge formation.

13. The homogenisation device of claim 10 wherein one annular ridge formation projects from the first homogenisation member, and two annular ridge formations project from the second homogenisation member, the annular ridge formation projecting from the first homogenisation member being located between the annular ridge formations projecting from the second homogenisation member.

14. The homogenisation device of claim 1 wherein the first homogenisation member is be in the form of a valve seat and the second homogenisation member is in the form of a valve plug.

15. The homogenisation device of claim 14 wherein an inlet flow passage to the homogenisation device is located towards the centre of the seat, so that fluid entering the flow passage between the plug and the seat is conveyed from the centre of the seat, radially outwardly through the undulating flow path formed between the homogenisation members towards peripheries of the homogenisation members.

16. The homogenisation device of claim 14 wherein the plug is moveable relative to the seat between a closed position in which the upper face of at least one ridge formation abuts its opposing plug or seat and an open position wherein the upper faces of all the ridge formations are displaced from the opposing plug or seat.

17. The homogenisation device of claim 16 further comprising a spring,
wherein the plug is biased by the spring towards the seat in order for the plug to be displaceable away from the seat when a pressurised fluid to be homogenised is introduced into the homogenisation device.

18. A homogenisation device including:
a body a flow passage therethrough;
opposing first and second homogenisation members located in the flow passage;
the homogenisation members having opposing homogenisation surfaces that form a flow restriction of the flow passage therebetween;
at least one of the homogenisation surfaces creating a flow resistance that causes at least part of a flow passing through the flow restriction to be diverged in a non-linear path across the homogenisation surface,
wherein at least one of the homogenisation members includes a ridge formation protruding therefrom, the ridge formation terminating in an upper face defining the homogenisation surface,
wherein the ridge formation includes a first edge and a second edge opposite the first edge, the upper face of the ridge formation extending between the first edge and the second edge, and
wherein the second edge of the ridge formation is of non-circular profile when viewed in plan.

19. The homogenisation device of claim 18 wherein the second edge is of oscillating profile when viewed in plan so as to form lateral troughs and peaks in the ridge formation.

20. The homogenisation device of claim 19 wherein the profile of the second edge is any profile selected from the group including undulated, convoluted, castellated or zig-zagged.

21. A homogenisation device including:
a body having a flow passage therethrough;
opposing first and second homogenisation members located in the flow passage;
the homogenisation members having opposing homogenisation surfaces that form a flow restriction of the flow passage therebetween;
at least one of the homogenisation surfaces creating a flow resistance that causes at least part of a flow passing through the flow restriction to be diverged in a non-linear path across the homogenisation surface,
wherein at least one of the homogenisation members includes a ridge formation protruding therefrom, the ridge formation terminating in an upper face defining the homogenisation surface,
wherein at least one of the homogenisation members is of circular circumference when viewed in plan, with the ridge formation projecting from said valve member being substantially annular,
wherein annular ridge formations project from both homogenisation members,
wherein the annular ridges are concentric and of unequal diameter in order to form spaced apart inner and outer ridges that define an undulating flow path across faces of the homogenisation members, each ridge formation being opposed to an opposing homogenisation member so as to form a plurality of flow restrictions in the undulating flow path,
wherein an innermost annular ridge formation is an upstream ridge formation with respect to the flow through the flow passage, and an outermost annular ridge formation is a downstream ridge formation with respect to the flow through the flow passage,
wherein a distance between an upper face of a ridge formation and an opposing homogenisation member is greater at an inner ridge formation than at an outer ridge formation.

22. A homogenisation member for use in a homogenisation device, including a body having at least one ridge formation projecting therefrom, the ridge formation terminating in an upper face that defines a homogenisation surface configured to oppose a homogenisation surface of an opposing homogenisation member, wherein the ridge formation includes a first edge and a second edge opposite the first edge, the upper face of the ridge formation extending between the first edge and the second edge, and wherein the first edge of the ridge formation is of non-circular profile when viewed in plan.

23. The homogenisation device of claim 22 wherein the upper face of the ridge formation is adapted to create a flow resistance that causes at least part of the flow passing through the flow restriction to be diverged in a non-linear path across the upper face.

24. The homogenisation device of claim 22 wherein the first edge is of oscillating profile when viewed in plan so as to form lateral troughs and peaks in the ridge formation.

25. The homogenisation device of claim 24 wherein the profile of the first edge is any profile selected from the group consisting of undulated, convoluted, castellated or zigzagged.

26. The homogenisation device of claim 24 wherein a first section of an upper edge of each trough defined by the oscillating ridge formation is bevelled so as to cause flow to diverge as it enters the trough, and an opposing second section of an upper edge of the trough is substantially square in order for the flow over the square edge to be diverged less than the flow over the bevelled edge.

27. The homogenisation device of claim 22 wherein the upper face of the ridge formation includes zones of different surface roughness in order for the homogenisation surface to create a non-uniform flow resistance that causes at least part of the flow passing through the flow restriction to be diverged in a non-linear path across the homogenisation surface.

28. A homogenisation member for use in a homogenisation device, including a body having at least one ridge formation projecting therefrom, the ridge formation terminating in an upper face that defines a homogenisation surface configured to oppose a homogenisation surface of an opposing homogenisation member, wherein the ridge formation includes a first edge and a second edge opposite the first edge, the upper face of the ridge formation extending between the first edge and the second edge, and wherein the second edge of the ridge formation is of non-circular profile when viewed in plan.

29. The homogenisation device of claim 28 wherein the second edge is of oscillating profile when viewed in plan so as to form lateral troughs and peaks in the ridge formation.

30. The homogenisation device of claim 29 wherein the profile of the second edge is any profile selected from the group consisting of undulated, convoluted, castellated or zigzagged.

\* \* \* \* \*

UNITED STATES PATENT AND TRADEMARK OFFICE
CERTIFICATE OF CORRECTION

PATENT NO.        : 8,066,425 B2                                          Page 1 of 1
APPLICATION NO.   : 11/998993
DATED             : November 29, 2011
INVENTOR(S)       : Boer et al.

It is certified that error appears in the above-identified patent and that said Letters Patent is hereby corrected as shown below:

Column 8, Line 2, Claim 18, after "body" insert -- having --

Signed and Sealed this
Third Day of April, 2012

David J. Kappos
*Director of the United States Patent and Trademark Office*